H. SCHAUBEL,
Assignor of one-half interest to E. L. LEVY.
Superheater for Steam-Boilers.
No. 9,069. Reissued Feb. 10, 1880.
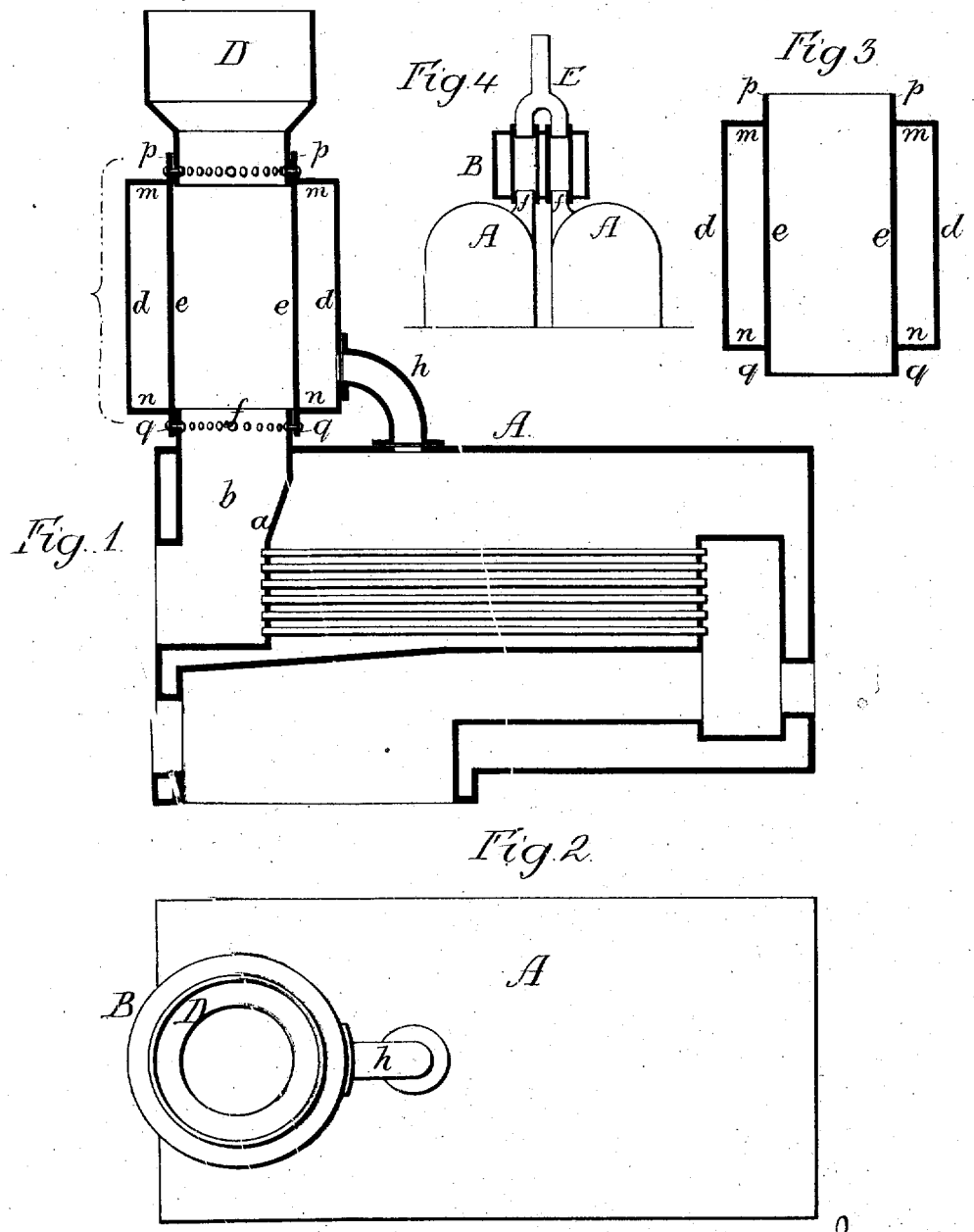
Witnesses
Henry Howson Jr.
Harry Smith
Inventor
Henry Schaubel
by his Attorneys
Howson and Sons

UNITED STATES PATENT OFFICE.

HENRY SCHAUBEL, OF PHILADELPHIA, PENNSYLVANIA, ASSIGNOR OF ONE-HALF OF HIS INTEREST TO EDMUND L. LEVY, OF SAME PLACE.

SUPERHEATER FOR STEAM-BOILERS.

SPECIFICATION forming part of Reissued Letters Patent No. 9,069, dated February 10, 1880.

Original No. 220,670, dated October 14, 1879. Application for Reissue filed January 5, 1880.

*To all whom it may concern:*

Be it known that I, HENRY SCHAUBEL, of Philadelphia, Pennsylvania, have invented a new and useful Improvement in Superheaters for Steam-Boilers, of which the following is a specification.

My invention relates to that class of superheaters for steam-boilers in which a superheating-drum is combined with a chimney, so that steam introduced into the said drum may be superheated by the products of combustion as they pass through the chimney; and the object of my invention is to make a superheater which shall be within itself a complete steam-tight structure, so that when in place it becomes part of the chimney, and can be readily detached therefrom to make way for a new superheater without materially disturbing the said chimney.

In the accompanying drawings, Figure 1 is a vertical section of a steam-boiler illustrating my invention; Fig. 2, a plan view; Fig. 3, a detached view of the superheater of the same, and Fig. 4 a modification of my invention.

The boiler to which my invention is applied is, in the present instance, of the marine flue and return-tubular type; but the invention may be used in connection with all kinds of steam-generators.

A represents the shell of the steam-boiler; *a*, the front tube-sheet; *b*, the uptake, terminating in a flange, *f*, which projects a short distance above the shell A.

B is the superheater, consisting of the outer casing, *d*, and the inner casing, *e*, connected together by the annular plates *m* and *n*, the inner casing projecting above and below the superheater, so as to form the flanges *p* and *q*.

A pipe, *h*, forms a communication between the steam-space of the boiler and the superheater, which has the usual outlet-pipe. (Shown by dotted lines in Fig. 1.)

The lower flange, *q*, of the superheater is bolted or riveted to the uptake-flange *f*, which projects above the shell of the boiler, and the lower end of the chimney D is bolted or riveted to the flange *p* of the superheater, so that the inner casing, *e*, becomes a section of the chimney.

Before the superheater is secured in its place it is a complete structure—that is to say, the parts are permanently secured together, so as to inclose a steam-tight annular chamber.

Two advantages result from the adoption of my invention: First, the inconvenience and expense of securing the outer casing of the superheater to a continuous chimney in a steam-tight condition is obviated; second, the superheater can be readily detached from the chimney for repairs or to make way for a new one without materially disturbing the said chimney.

In Fig. 3 I have shown a modification in which the superheater has two inner casings, one communicating with the uptake of one boiler and the other with the uptake of an adjoining boiler, the two inner casings communicating with the chimney D through a breeches-pipe, E.

I do not desire to claim, broadly, the combination of a superheating-drum with a chimney which passes through the said drum; but

I claim as my invention—

The combination of the uptake-flange *f* and chimney D of a steam-boiler with a superheater comprising inner and outer casings, and having flanges *p* and *q* bolted or riveted to said uptake flange and chimney, whereby the superheater forms a section of the chimney capable of being easily attached and removed, all substantially as set forth.

In testimony whereof I have signed my name to this specification in the presence of two subscribing witnesses.

HENRY SCHAUBEL.

Witnesses:

ALEXANDER PATTERSON,
HARRY SMITH.